(12) United States Patent
Liu et al.

(10) Patent No.: US 9,080,105 B1
(45) Date of Patent: Jul. 14, 2015

(54) PHOSPHORS, FABRICATING METHOD THEREOF, AND LIGHT EMITTING DEVICE EMPLOYING THE SAME

(71) Applicant: Chung Yuan Christian University, Zhongli, Taoyuan County (TW)

(72) Inventors: Wei-Jen Liu, Taoyuan (TW); Pin-Chun Lin, Zhubei (TW)

(73) Assignee: CHUNG YUAN CHRISTIAN UNIVERSITY, Zhongli, Taoyuan County (TW)

( * ) Notice: Subject to any disclaimer, the term of this patent is extended or adjusted under 35 U.S.C. 154(b) by 0 days.

(21) Appl. No.: 14/218,254

(22) Filed: Mar. 18, 2014

(30) Foreign Application Priority Data

Jan. 16, 2014 (TW) .............................. 103101567 A

(51) Int. Cl.
*F21V 9/16* (2006.01)
*C09K 11/77* (2006.01)

(52) U.S. Cl.
CPC ......... *C09K 11/7792* (2013.01); *C09K 11/7774* (2013.01)

(58) Field of Classification Search
USPC ....................................................... 250/458.1
See application file for complete search history.

(56) References Cited

U.S. PATENT DOCUMENTS

| | | | |
|---|---|---|---|
| 2007/0278930 A1* | 12/2007 | Takahashi et al. | 313/485 |
| 2009/0091237 A1* | 4/2009 | Hirosaki et al. | 313/495 |
| 2014/0167600 A1* | 6/2014 | Todorov et al. | 313/503 |

* cited by examiner

*Primary Examiner* — David J Makiya
*Assistant Examiner* — Taeho Jo
(74) *Attorney, Agent, or Firm* — Muncy, Geissler, Olds & Lowe, P.C.

(57) ABSTRACT

A phosphor material is provided which having the chemical formula is $(Ln_{1-x-y-z}Ce_x)_3Al_5O_{12-y-z}C_yN_z$, wherein Ln is one or more metals selected from Y, La, Pr, Nd, Eu, Gd, Tb, Dy, Yb, Er, Sc, Mn, Zn, Cu, Ni and Lu, and $0.01 \leq x \leq 0.3$, $0 \leq y \leq 0.3$, and $0.001 \leq z \leq 0.3$. Before the sintering process with high temperature is performed, the different kinds of nitrogen source or the combination of nitrogen source and carbon source thereof is added into the synthesized phosphor to provide carbon atom (C) and nitrogen atom (N) that is doped into the phosphor material, in which the nitrogen source includes an organic and an inorganic nitrogen compound. The nitrogen source is added in addition to substitute oxygen atom and to perform doping process.

11 Claims, 4 Drawing Sheets

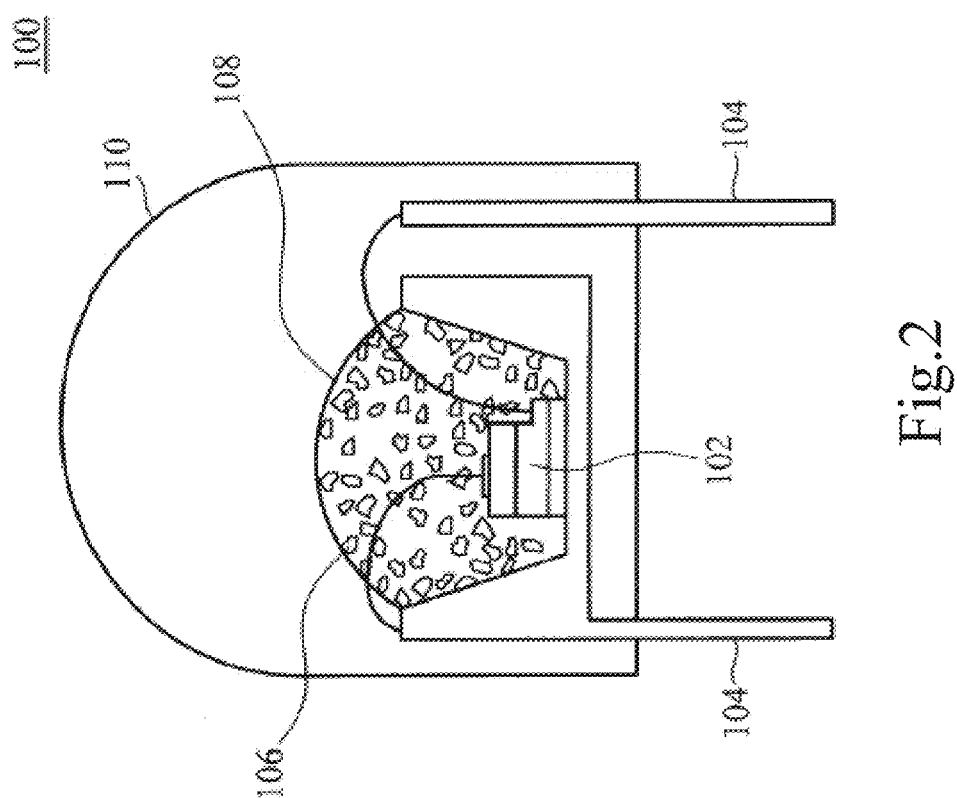

PHOSPHORS, FABRICATING METHOD THEREOF, AND LIGHT EMITTING DEVICE EMPLOYING THE SAME

BACKGROUND OF THE INVENTION

1. Field of the Invention

The present invention relates to a phosphor material and the forming method thereof, and more particularly to a phosphor material with carbon and nitrogen co-doping and an application of phosphor material to improve the luminous efficiency of the light emitting component.

2. Description of the Prior Art

Currently, for the light emitting diodes (LED) application, the white luminous device will gradually replace the traditional tungsten lamp and fluorescent lighting, because of the following characteristics (1) Small size and suitable for the illumination of array package and can apply for any combination of different colors; (2) Long usage life, the usage life can be up to 10,000 hours, and is longer than traditional incandescent light bulbs for more than 50 times; (3) Durable, the encapsulation of white luminous device is transparent resin which can use for the shock resistance and impact resistance; (4) Environmental, the luminous device did not contain mercury therein and no pollution and waste disposal problems; and (5) Energy saving and low power consumption, in general, luminous device is about ⅓ to ⅕ times the power consumption of incandescent light bulbs.

The so-called "white light" usually means a mixed light of multi-colors which is generated by the white light can be seen by the human eyes, and includes at least two or more kinds of color light wavelength. For example, the blue light is mixed with yellow light that can obtain the white light with two wavelengths, and blue light is mixed with green light and red light that can obtain the white light with three wavelengths.

The white light emitting diode can be divided into an organic light emitting diode and inorganic light emitting diode according to the material used in the manufacture. The illumination for the white light source includes three manners. First, the white light luminous module is composed by red, blue, and green light emitting diodes which include higher illumination efficiency and higher color rendering. However, because of the grain with different color have different grain epitaxial materials so as to produce different voltage characteristics. Therefore, the manufacturing cost is high so that the circuit design is complex and difficult to mix light.

Second, the current mainstream is white light emitting diode that is made by the blue light emitting diode to excite yellow YAG phosphor which is proposed by Nichia Corporation. Optical glue is mixed with yellow YAG phosphor is coated outer of blue light emitting diode chip, and the blue light emitting diode chip can emit the wavelength of blue light is range about 400 nm to 530 nm so as to excite yellow phosphor to generate yellow light and yellow light is emitted by remaining blue light cooperated with yellow light so as to generate the white light with two wavelengths that is mixed by blue light and yellow light.

However, such white LED has many limitations for illumination, the main reason as follows: because the blue light is the most part of the emission spectrum such that white LED has high color temperature and the color temperature is uneven. For above reasons, the effect between the blue light and yellow light need to improve so as to reduce the intensity of blue light or to increase the intensity of yellow light. Furthermore, because the wavelength of blue light-emitting diodes will vary with the temperature increase thus resulting in color control for a white light source is not easy. In addition, the color rendering of white LED is poor due to the lacks of red light.

The third is that ultraviolet light emitting diode excites the blue phosphor, green phosphor and red phosphor mixed with a certain proportion in the optical glue so as to obtain a white light with three wavelengths. Such white light LED can be combined after manufacturing the phosphor material of three primary colors separately and thus the process flexibility and nature are better than the previous two white LEDs.

Presently, the synthesis of the phosphor includes (1) Solid-state reaction method. This method disposes the reactant in the gas pressure sintering furnace to react and thus can be called gas pressure sintering method (GPS). The host lattice for white LED is composed by metal oxide, metal element and metal nitride and silicon-containing compound are reacted with nitridation reaction under rich-nitrogen and high temperature environment. The earliest and most commonly used silicon-containing compound is $Si_3N_4$, for the chemical inertness of silicon-containing compound, the solid-state reaction method is performed under an environment with high temperature (ranges from 1500° C. to 2000° C.) and high pressure nitrogen (ranges from 10 atm to 100 atm), and thus the reaction requires the expensive equipment and high cost. (2) Carbothermal reduction nitridation method (CRN). The different between CRN method and solid-state reaction method is that carbon as a reduction agent in the nitridation reaction so as to the reaction is performed under the lower pressure and rich-nitrogen environment (ranges from 1 to 5 atm). However, the duration of the reaction is longer about eight hours. In addition, the carbon content needs to control accurately because of excessive carbon will generate silicon carbide that will affect the fluorescence intensity. In the light of above problem, a carbon remove step is required to perform after nitridation reaction is completed, but the residual carbon within the product is not easy to completely remove, although such method can react in a lower nitrogen pressure, but the reaction will be caused time-consuming, energy-consuming and steps complicated problems. (3) Gas-reduction nitridation method (GRN). The theory is same as that of CRN method, but the different is that the organic gas such as methane substitutes the carbon as the reduction agent to perform nitridation reaction. Although this method resolves the excessive carbon problem, but this method utilizes gas and the reaction is carried out at high temperatures, such that the reaction has extremely dangerous and has time-consuming and energy-consuming problems. (4) Hydrothermal method. The reactant is usually nitric acid compound which dissolve in the solvent and the aqueous NaOH is added to adjust the pH value. The reaction is stirred at low temperature (about 200° C.) and then the precipitates are generated from the reactant. The precipitates (can be regarded as precursors) is performed with wash, centrifugation, filtration and drying and then sintering in a high temperature furnace with nitrogen environment and the hydrogen gas as the reduction gas is introduced into the high temperature furnace. The advantage of this method is that the reactant is evenly mixed by the step of dissolution and precipitation, and the sintering temperature is about 1000° C. to save energy effectively. The disadvantage is that the reaction step is more complicated and the reaction sometimes requires hydrogen to perform reduction, and thus this method has safety concerns. In addition, the crystalline phase for the synthesized product is weak and has lower fluorescent luminous efficiency so as to be improved. (5) Combustion synthesis. The reactants include metal, metal oxide and metal nitride and are mixed uniformly to dispose in the reactor. Then, the pressure of nitrogen is adjusted up to 2.0 to 8.0 MPa so as to ignite above reactants. The advantage of this method is a simple process step, less energy-consuming and simple equipment and thus it can be performed with mass-production and lower cost. However, the reaction must be carried out under extremely high pressure to improve the conversion rate so that the safety of synthetic requires being concerned and is not suitable for the industrial application. If the reaction pressure is lower, the product may result in improper control of agglomerating or can not be ignited, so as to the conversion rate is lower and the grinding step must be complicated. In addition, because the reaction is heating and cooling rapidly, so the product may contain a crystal defects with high concentration, such that the fluorescence intensity of the phosphor is poor.

According to conventional prior art, the nitridation reaction for preparing phosphor is performed at high temperature and under high pressure environment, as $Si_3N_4$ is used for the above described solid-state reaction method which must be performed at a high temperature (1500~2000° C.) and under nitrogen pressure (10~100 atm) environment, and the reaction requires expensive equipment and high cost. In addition, by using CRN method, the carbon is used as reduction agent that is added into the nitridation, but the excess carbon will affect the phosphor intensity. Furthermore, GRN method using organic gas such as methane as a reduction agent for the nitridation reaction, and the reaction is carried out by using a gas at high temperature, so the reaction will be dangerous and has time-consuming and energy-consumption problems. Moreover, in the past, for preparing the nitride phosphor or oxynitride phosphor, the nitride-containing compound is merely mixed and heated with the additional compound, and the mixture such as oxide is composed by the carbon or nitrogen is performed reduction reaction for nitridation but the characteristics of the phosphor can not be obtained sufficiently, and the nitrogen source such as alkali metal nitride or alkaline metal nitride has a poor operability problem.

Therefore, the nitrogen atoms in the nitrogen source can be used as the host lattice of nitride phosphor or oxynitride phosphor. On the other hand, the nitrogen source must be reacted sufficient to prevent incomplete reaction so as to cause lattice defects, and light illumination efficiency decrease. Moreover, according to conventional nitride or oxynitride manufacturing method, by using the liquid phase sintering of the firing process, the bonding between the particles is extremely hard, in order to obtain the target particle order of the phosphor, the crushed powder processing must be performed. In addition, when the crushed condition is more severe for phosphor, the chance of introduction of contamination is increased and the defect is introduced into the particle surface so as to affect the phosphor characteristic and the light emitting characteristics are deteriorated to affect the luminous efficiency. The synthesis of currently nitride phosphor or oxynitride phosphor is performed at high temperature and under high pressure, spent a longer reaction time or is performed with complicated steps, and thus the yield is not large and high production costs is required.

According to the aforementioned description, the synthesized phosphor is limited by manufacturing method, such that the reaction is performed at high temperature, under high pressure and complicated operation steps. According to the change of the crystal structure of phosphor, the change in the light emission characteristics is introduced, such as the illumination wavelength shift and the drop in the luminous efficiency. Thus, the prescription of raw material needs to be adjusted to obtain suitable raw recipe illumination wavelength and better luminous efficiency. Therefore, a preparation method must be developed for various phosphors, such as red phosphor, green phosphor and blue phosphor by simple process, low cost, the raw materials can obtain easy and excellent operability conditions and when the crystal lattice of phosphor is not changed, the luminous efficiency can be increased. Furthermore, the synthesized phosphor or commercially available phosphor also can use such preparation method for increase the illumination efficiency.

SUMMARY OF THE INVENTION

The major object of this invention is to provide a phosphor material, which can be provided with red color, green color, yellow color or blue color. For the phosphor oxide structure, the phosphor precursor did not include carbon atom (C) or nitrogen atom (N) and the phosphor precursor can be the combination of the metal oxide, the metal carbonate and the rear-earth oxides. The different kinds of nitrogen source or the combination of nitrogen source and carbon source thereof is added into synthesized phosphor before the synthesized phosphor is performed by the sintering process with high temperature. The nitrogen source includes an organic compound or inorganic compound. The carbon source and nitrogen source is doped into the phosphor to substitute the oxide, the grain of phosphor is to be grown up, the crystal structure is expanded, the surface morphology of the crystal structure is flatter, the lattice integrity is increased and the crystallinity of the phosphor and the illumination efficiency is also improved. In addition, the nitridation of the doping process did not only cause the excessive carbon which is generated by CRN method but also perform under atmosphere. At same time, the crystal structure of the commercially available phosphor would not be changed to generate the crystallographic defect so as to apply for any phosphor materials. According to above method, the quantum efficiency and package efficiency of phosphor material can be improved effectively such that the phosphor material can combine with another suitable phosphor material with various colors to form a white luminous device in the future.

According to above object, the preset invention provides a phosphor material includes the chemical formula that can be expressed as $(Ln_{1-x-y-z}Ce_x)_3Al_5O_{12-y-z}C_yN_z$, in which Ln is one or more metals selected from Y, La, Pr, Nd, Eu, Gd, Tb, Dy, Yb, Er, Sc, Mn, Zn, Cu, Ni and Lu, and $0.01 \leq x \leq 0.3$, $0 \leq y \leq 0.3$ and $0.001 \leq z \leq 0.3$.

According to above object, the present invention also provides a method for forming the phosphor material and for the preparation of phosphor with various colors which includes red phosphor, green phosphor, blue phosphor or yellow phosphor. The preparation of the yellow phosphor includes a mixture is obtained by mixing the following components, and the components include (1) oxygen-containing compound with Y (Yttrium); (2) oxygen-containing compound with Al (aluminum); (3) oxygen-containing compound with Ce (Cerium); (4) halide compound with Ba (Barium); (5) $H_3BO_3$; and (6) an organic source or inorganic source with one or more component or the combination of the organic nitrogen source and the inorganic nitrogen source. Then, the after the mixture is grounded, the mixture is disposed in the crucible and arranged in a high temperature furnace to perform sintering process under a reduction environment.

According to above object, the present invention also provides another method for forming the phosphor material which includes a mixture is obtained by mixing the components and the components includes (1) a commercially available phosphor with different colors, for example, ZYP550 ($Y_3Al_5O_{12}$:$Ce^{3+}$); (2) an organic nitrogen source or an inorganic nitrogen source with one or more components or the combination of the organic nitrogen source and the inorganic nitrogen source. After the mixture is grounded, the mixture is disposed in the crucible and is placed in a high temperature furnace to perform a sintering process under a reduction environment.

According to above object, the present invention also provides a luminous device, which includes a lamp tube, a fluorescence excitation light source, electrodes and wavelength conversion element. The fluorescence excitation light source and electrodes are disposed on two sides of the lamp tube respectively. The fluorescence excitation light source can be light emitting diode (LED), laser diode (LD), organic light emitting diode (OLED), cold cathode fluorescent lamp (CCFL), external electrode fluorescent lamp (EEFL), or vacuum ultra violet (VUV). The wavelength conversion element is phosphor material which coated on the inner wall of the lamp tube for absorbing the fluorescence excitation light source to emit the visible light. The phosphor material is one or more combination of red phosphor, green phosphor, blue phosphor and yellow phosphor. In addition, the lamp tube of the luminous device can includes mercury (Hg) and inert gas. The luminous device can be used as the indicator device (such as traffic lights, the indicator of the instrument), the backlight (such as dashboard, the backlight of the displayer) or the lighting device (such as bottom light, traffic lights, notice boards), and so on.

In addition, the preparation of the phosphor material can also apply for synthesized phosphor material or commercially available phosphor material, by doping the organic nitrogen source or inorganic nitrogen source into the phosphor to grow up the phosphor grain, the crystal structure is expanded, the surface morphology of the crystal structure is flatter, the lattice integrity is increased and the crystallinity of the phosphor and the illumination efficiency is also improved. The phosphor can includes red phosphor, yellow phosphor, green phosphor or blue phosphor.

Other objects, advantages and salient features of the invention will become apparent from the following detailed description taken in conjunction with the annexed drawings, which disclosed preferred embodiments of the invention.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 2 is a cross-sectional view of showing a phosphor luminous device according to the thirty-fifth embodiment of the present invention disclosed herein;

DESCRIPTION OF THE PREFERRED EMBODIMENT

Figure 1:
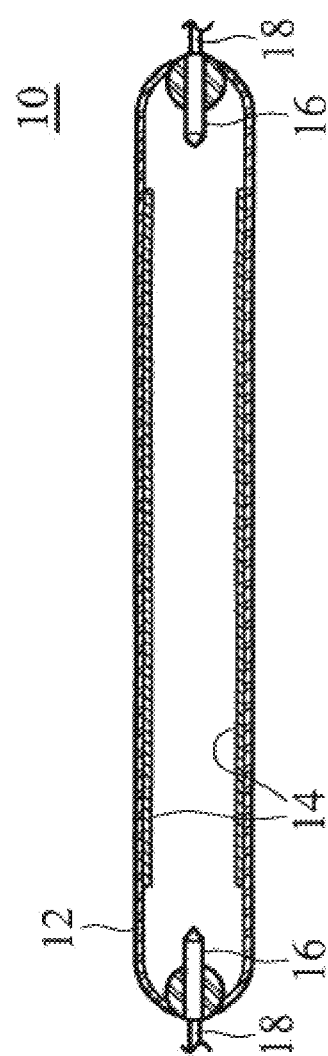
FIG. 1 is a cross-sectional view of showing a phosphor luminous device according to the thirty-fourth embodiment of the present invention disclosed herein.

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

The present invention provides a phosphor material includes the chemical formula can be expressed as $(Ln_{1-x-y-z}Ce_x)_3Al_5O_{12-y-z}C_yN_z$, in which Ln is one or more metals selected from Y, La, Pr, Nd, Eu, Gd, Tb, Dy, Yb, Er, Sc, Mn, Zn, Cu, Ni and Lu, and $0.01 \leq x \leq 0.3$, $0 \leq y \leq 0.3$ and $0.001 \leq z \leq 0.3$. According to the embodiment of present invention, Ln is Y and the formula can be shown as $Y_3Al_5O_{12-z}N_z:Ce^{3+}$ or $Y_3Al_5O_{12-y-z}C_yN_z:Ce^{3+}$ can be doped by nitrogen source or the combination of nitrogen source and carbon source thereof. The nitrogen source can include organic nitrogen source and inorganic nitrogen source, in which the organic nitrogen source includes $C_6H_{12}N_4$(HMT), $C_6H_5COONH_4$, $(NH_4)_2CO_3$, $HOC(CO_2NH_4)(CH_2CO_2NH_4)_2$, $HCO_2NH_4$, $C_{11}H_7N$, $C_{10}H_6(CN)_2$ and $C_{12}H_7NO_2$ and inorganic nitrogen source includes $NH_4NO_3$ and other inorganic nitrate salts.

In addition, the preparation method of the present invention can apply for synthesized phosphor material or commercially available phosphor material, the phosphor precursor or phosphor is mixed with the organic nitrogen source or inorganic nitrogen source and the doping-nitrogen or the combination of both doping-nitrogen and doping-carbon is doped into the phosphor, such that the phosphor crystalline is grown up, the crystal structure is expanded and the surface morphology of the crystal structure is flatter to improve the lattice integrity, phosphor crystalline and the illumination efficiency. The phosphor precursor is the combination of metal oxide, metal carbonate and rear-earth oxides, and the phosphor can be the red phosphor such as $(Sr,Ca)S:Eu^{2+}$, $(Y,La,Gd,Lu)_2O_3:(Eu^{3+}, Bi^{3+})$, $(Y,La,Gd,Lu)_2O_2S:(Eu^{3+},Bi^{3+})$, $Ba_3SiO_5:Eu^{2+}$, $(Ca,Sr,Ba)_2Si_5N_8:Eu^{2+}$, $(Ca,Sr)AlSiN_3:Eu^{2+}$, $Ba_3MgSi_2O_8:(Eu^{2+},Mn^{2+})$ or $ZnCdS:AgCl$. The phosphor can also be the yellow phosphor such as $Y_3Al_5O_{12}:Ce^{3+}$(YAG), $Sr_3SiO_5:Eu^{2+}$, $Tb_3Al_5O_{12}:Ce^{3+}$(TAG) or $(Ca,Mg,Y)Si_wAl_xO_yN_z:Eu^{2+}$. The green phosphor can be $Lu_3Al_5O_{12}:Ce^{3+}$, $SrSi_2N_2O_2:Eu^{2+}$, $CaSc_2O_4:Ce^{3+}$, $(Ca,Sr,Ba)_2(Mg,Zn)Si_2O_7:Eu^{2+}$, $Sr_2LiSiO_4F:Eu^{2+}$, $Ca_3(Mg,Sc)_2Si_3O_{12}:Ce^{3+}$, $(Ca,Sr,Ba)_4Al_{14}O_{25}:Eu^{2+}$, $BaMgAl_{10}O_{17}:(Eu^{2+},Mn^{2+})$, $Ca_8Mg(SiO_4)_4Cl_2:(Eu^{2+},Mn^{2+})$, $Sr_4Si_3O_8Cl_4:Eu^{2+}$, $Ca_3SiO_4Cl_2:Eu^{2+}$, $Sr_2SiO_3Cl_2:Eu^{2+}$ or $(Ca,Ba,Sr)_2SiO_4:Eu^{2+}$. The blue phosphor can be expressed as $BaMgAl_{10}O_{17}:Eu^{2+}$, $Sr_5(PO_4)Cl:Eu^{2+}$ or $Sr_2Si_3O_8 \cdot 2SrCl_2:Eu^{2+}$.

The first embodiment of the present invention provides a phosphor and the preparation method, and the preparation method as follows.

First, the weighed 0.3980 g yttrium oxide ($Y_2O_3$), 0.3186 aluminum oxide ($Al_2O_3$), 0.0387 g $CeO_3$, 0.0091 g $BaF_3$, and 0.0091 g (1.2 wt %) $H_3BO_3$ to evenly mix and is grounded. Then, the mixture is disposed into the crucible. The mixture in the crucible is displaced in a high temperature furnace and is performed with a sintering process at temperature which ranges from 200 to 1600° C. and sintering duration ranges from 0.5 to 48 hrs under $N_2$ (nitrogen gas), $H_2$ (hydrogen gas)/$N_2$ (nitrogen gas) or Ar (argon)/$N_2$ (nitrogen gas) reduction environment, in which the preferred sintering duration is about 8 hours. Then, the pure phase phosphor with chemical formula can be expressed as $Y_3Al_5O_{12}:Ce^{3+}$ that is obtained from the high temperature furnace.

Next, the pure phase $Y_3Al_5O_{12}:Ce^{3+}$ phosphor is excited by the light source with 460 nm wavelength to obtain the data for an illumination wavelength and a relative illumination wavelength as shown in Table 1.

Figure 3A:
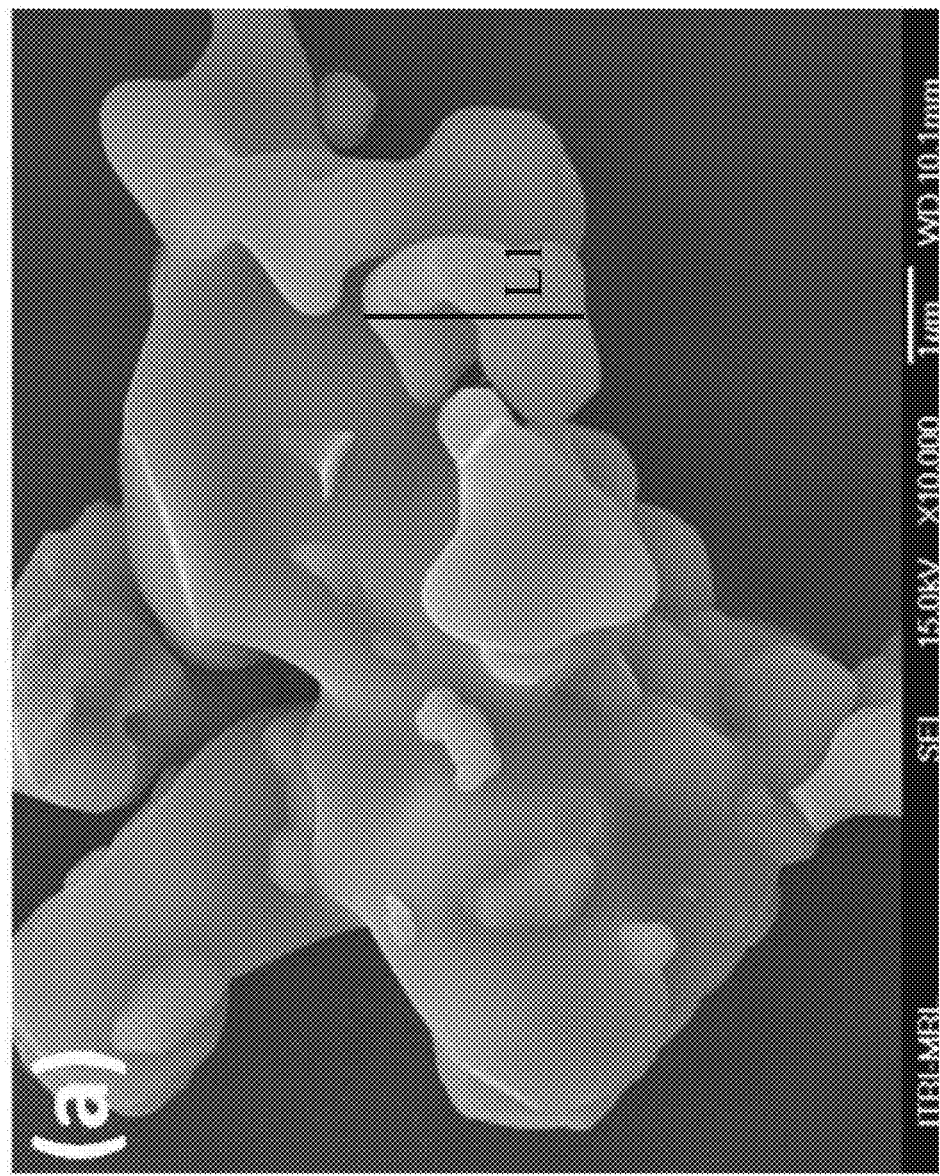
FIG. 3(a) is a schematic represents SEM of 10,000 times for the phosphor material according to the first embodiment of the present invention disclosed herein.

The first embodiment illustrates the prepared phosphor without adding organic nitrogen source or inorganic nitrogen source. Then please refer to FIG. 3(a). FIG. 3(a) is a schematic represents SEM of 10,000 times for the phosphor material according to the first embodiment of the present invention. According to FIG. 3(a), the particle size L1 for the phosphor crystalline is about 2.34 um.

The second embodiment to the seventh embodiment of the present invention also provides a phosphor material and the preparation method therefore, in which the manufacturing steps, conditions, and the component content is the same as the first embodiment, the different is that $C_6H_{12}N_4$ is added into the phosphor material in second embodiment to the seventh embodiment in different proportions, the added proportion such as 5 wt %, 10 wt %, 20 wt %, 50 wt %, 80 wt %, or 100 wt % and also shown in Table 1. The chemical formula of prepared phosphor can be expressed as $Y_3Al_5O_{12-y-z}C_yN_z$:$Ce^{3+}$, and $0 \leq y \leq 0.3$, and $0.001 \leq z \leq 0.3$.

Then, phosphor $Y_3Al_5O_{12-y-z}C_yN_z$:$Ce^{3+}$ is excited by the light source with 460 nm wavelength to obtain the data for an illumination wavelength and a relative illumination wavelength as shown in Table 1.

Figure 3B:
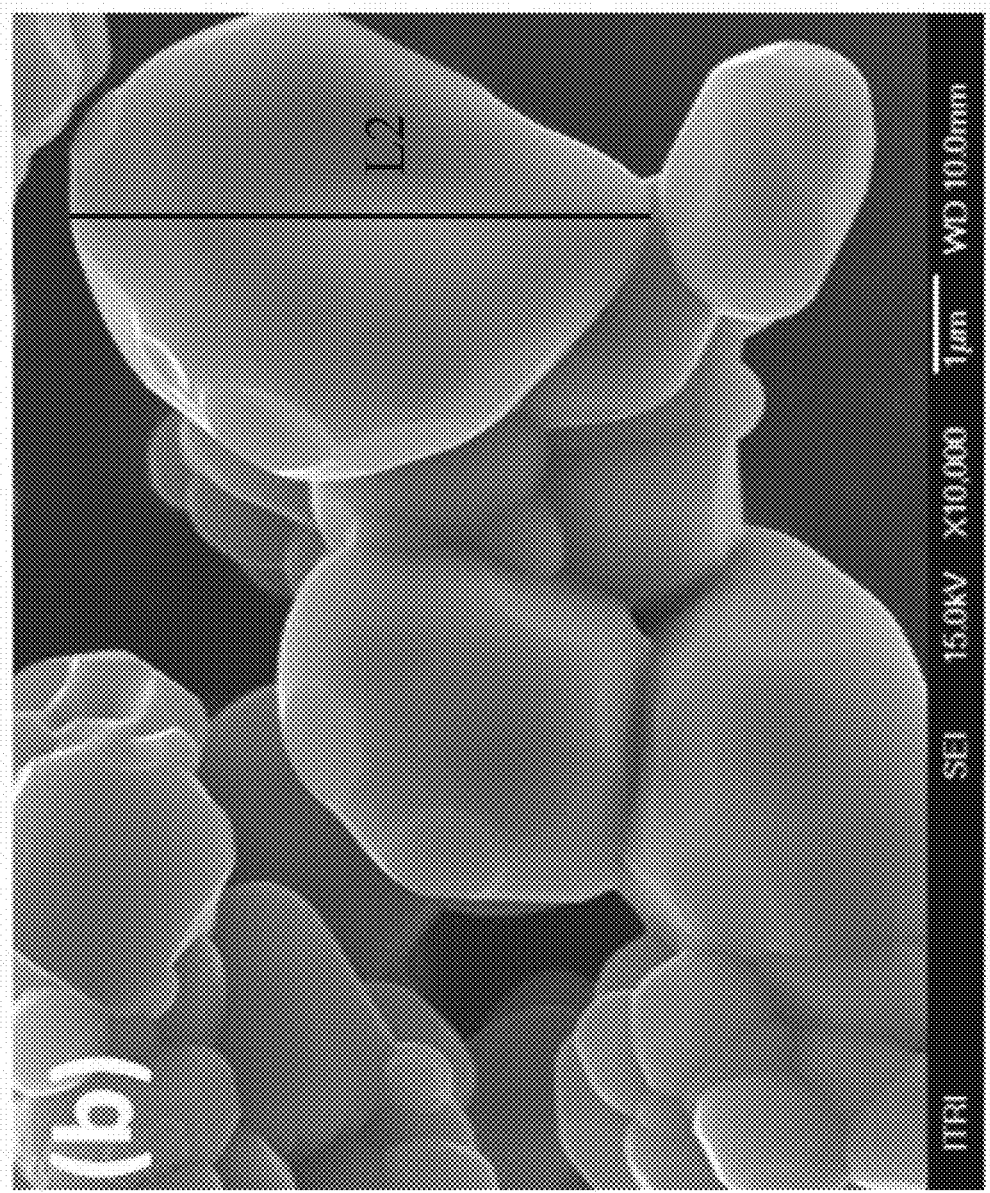
FIG. 3(b) is a schematic represents SEM of 10,000 times for the phosphor material according to the sixth embodiment of the present invention disclosed herein.

The sixth embodiment of the present invention is the result when 80 wt % $C_6H_{12}N_4$ is added into the phosphor. To compare with the first embodiment, the increase of relative illumination intensity is 3.46%. Please refer to FIG. 3(b). FIG. 3(b) is a schematic represents SEM of 10,000 times for the phosphor material according to the sixth embodiment of the present invention. According to FIG. 3(b), the particle size L2 of the phosphor crystalline is about 5.93 um. To compare with the first embodiment, the particle size is increased 2.5 times. Thus, the relative illumination intensity for the phosphor after nitridation reaction by using organic nitrogen source or inorganic nitrogen source will be increased and the crystallinity degree can grow significantly and the corresponding illumination efficiency is also improved. Furthermore, the increase degree for the relative illumination intensity of the sixth embodiment is not a preferred embodiment for the first embodiment to the 33 embodiment, and thus the increase of corresponding relative illumination and high illumination efficiency can be obtained. Thus, the better experiment data can be obtained from other better embodiment.

The eighth embodiment to eleventh embodiment of the present invention provides a phosphor material and the preparation method thereof, in which the manufacturing steps, conditions, and the component content is the same as the first embodiment, the different is that $NH_4NO_3$ is added into the phosphor material in the eighth embodiment to eleventh embodiment in different proportions, the added proportion such as 10, 20 or 50 wt % and also shown in Table 1. The chemical formula of prepared phosphor can be expressed as $Y_3Al_5O_{12-z}N_z$:$Ce^{3+}$, and $0.001 \leq z \leq 0.3$.

Next, phosphor $Y_3Al_5O_{12-z}N_z$:$Ce^{3+}$ is excited by the light source with 460 nm wavelength to obtain the data for an illumination wavelength and a relative illumination wavelength as shown in Table 1.

According to the result for the first embodiment to the eleventh embodiment, the relative illumination intensity compared to that of the first embodiment shows an largest increase of about 10% for the addition of 50 wt % organic nitrogen source ($C_6H_{12}N_4$) after nitridation reaction. In addition, the relative illumination intensity compared to that of the first embodiment shows an largest increase of about 21% for the addition of 10 wt % inorganic nitrogen source ($NH_4NO_3$) after nitridation reaction. From FIG. 3(a) and FIG. 3(b) SEM images, after the phosphor or phosphor precursor is performed with nitridation reaction by doping with organic nitrogen source or inorganic nitrogen source, the phosphor grain is to be grown up, the crystal structure is expanded and the surface morphology of the crystal structure is flatter to increase the phosphor lattice integrity and to increase the cystallinity of the phosphor, such that the relative illumination intensity and the illumination efficiency can also be improved.

TABLE 1 the components of the nitrogen source for the phosphor

| embodiment | $C_6H_{12}N_4$ (wt %) | $NH_4NO_3$ (wt %) | Excite wavelength (nm) | Illumination wavelength (nm) | Relative illumination intensity |
|---|---|---|---|---|---|
| 1 | — | — | 460 | 547 | 100.00 |
| 2 | 5 | — | 460 | 552 | 104.87 |
| 3 | 10 | — | 460 | 552 | 109.47 |
| 4 | 20 | — | 460 | 552 | 100.91 |
| 5 | 50 | — | 460 | 551 | 110.16 |
| 6 | 80 | — | 460 | 551 | 103.46 |
| 7 | 100 | — | 460 | 550 | 103.81 |
| 8 | — | 5 | 460 | 539 | 118.30 |
| 9 | — | 10 | 460 | 541 | 121.93 |
| 10 | — | 20 | 460 | 540 | 119.13 |
| 11 | — | 50 | 460 | 541 | 110.16 |

The twelfth embodiment to the twenty-seventh embodiment of the present invention provides a phosphor material and the preparation method thereof and the preparation method as follows:

The weighed 0.5 g commercially available phosphor ZYP550 (($Y_3Al_5O_{12}$:$Ce^{3+}$) and the different component and different proportion as shown in Table 2 to evenly mix and is grounded. Then, the mixture is disposed into the crucible. The mixture in the crucible is displaced in a high temperature furnace and is performed with a sintering process at temperature ranges from 200 to 1600° C. and sintering duration ranges from 0.5 to 48 hrs under $N_2$ (nitrogen gas), $H_2$ (hydrogen gas)/$N_2$ (nitrogen gas) or Ar (argon)/$N_2$ (nitrogen gas) reduction environment, in which the preferred sintering duration is about 8 hours. Then, the phosphor with chemical formula can be expressed as $Y_3Al_5O_{12-y-z}C_yN_z$:$Ce^{3+}$ or $Y_3Al_5O_{12-z}N_z$:$Ce^{3+}$ that is obtained from the high temperature furnace, in which $0 \leq y \leq 0.3$ and $0.001 \leq z \leq 0.3$.

Then, the phosphor ($Y_3Al_5O_{12-y-z}C_yN_z$:$Ce^{3+}$ or $Y_3Al_5O_{12-z}N_z$:$Ce^{3+}$) is excited by the light source with 460 nm wavelength to obtain the data for the illumination wavelength and a relative illumination intensity, and the preferred result as shown in Table 2.

From the result of the twelfth embodiment to the seventeenth embodiment and the twenty-first embodiment to the twenty-seventh embodiment, the organic nitrogen source is added into the commercially available phosphor (ZYP550) for nitridation reaction, the chemical formula of prepared phosphor can be expressed as $Y_3Al_5O_{12-y-z}C_yN_z$:$Ce^{3+}$, and $0 \leq y \leq 0.3$, and $0.001 \leq z \leq 0.3$. From the result of the eighteenth embodiment to the twentieth embodiment, the inorganic nitrogen source is added into the commercially available phosphor (ZYP550) for nitridation reaction, the chemical formula of prepared phosphor can be expressed as $Y_3Al_5O_{12-z}N_z$:$Ce^{3+}$, and $0.001 \leq z \leq 0.3$. In addition, to compare with the reference sample, the relative illumination intensity is largest increased in the sixteenth embodiment and twenty-sixth embodiment which is increased about 14% and 9%.

TABLE 2 the components of the nitrogen source for the phosphor

| Embodiment/ reference sample | ZYP550 (g) | $C_6H_{12}N_4$ (wt %) | $(NH_4)_2CO_3$ (wt %) | $NH_4NO_3$ (wt %) | $HCO_2NH_4$ (wt %) | $C_6H_{17}N_3O_7$ (wt %) | Excite wavelength (nm) | Illumination wavelength (nm) | Relative illumination intensity |
|---|---|---|---|---|---|---|---|---|---|
| Reference sample | 0.5 | — | — | — | — | — | 460 | 546 | 100.00 |
| 12 | 0.5 | 10 | — | — | — | — | 460 | 546 | 104.19 |
| 13 | 0.5 | 50 | — | — | — | — | 460 | 546 | 101.80 |
| 14 | 0.5 | 5 | 5 | — | — | — | 460 | 546 | 106.90 |
| 15 | 0.5 | 5 | — | 5 | — | — | 460 | 545 | 103.50 |
| 16 | 0.5 | 5 | — | — | 5 | — | 460 | 546 | 114.10 |
| 17 | 0.5 | 5 | — | — | — | 5 | 460 | 544 | 102.00 |
| 18 | 0.5 | — | — | 5 | — | — | 460 | 536 | 102.40 |
| 19 | 0.5 | — | — | 20 | — | — | 460 | 536 | 103.80 |
| 20 | 0.5 | — | — | 50 | — | — | 460 | 538 | 104.30 |
| 21 | 0.5 | — | — | — | 5 | — | 460 | 546 | 104.12 |
| 22 | 0.5 | — | — | — | 10 | — | 460 | 546 | 104.74 |
| 23 | 0.5 | — | — | — | 20 | — | 460 | 546 | 106.22 |
| 24 | 0.5 | — | 5 | — | — | — | 460 | 546 | 104.76 |
| 25 | 0.5 | — | 10 | — | — | — | 460 | 546 | 104.40 |
| 26 | 0.5 | — | 20 | — | — | — | 460 | 546 | 109.10 |
| 27 | 0.5 | — | 50 | — | — | — | 460 | 546 | 102.30 |

The twenty-eighth embodiment to the thirty-third embodiment of the present invention provides a phosphor material and the preparation method thereof, and the preparation method as follows:

The weighed 0.5 g synthesized phosphor ($Y_3Al_5O_{12}$:$Ce^{3+}$) and the different components and different proportion as shown in Table 3 to evenly mix and is grounded. Then, the mixture is disposed into the crucible. The mixture in the crucible is displaced in a high temperature furnace and is performed with a sintering process at temperature ranges from 200 to 1600° C. and sintering duration ranges from 0.5 to 48 hrs under $N_2$ (nitrogen gas), $H_2$ (hydrogen gas)/$N_2$ (nitrogen gas) or Ar (argon)/$N_2$ (nitrogen gas) reduction environment, in which the preferred sintering process is performed at temperature 1450° C. and the duration is about 8 hours. Then, the pure phase phosphor with chemical formula can be expressed as $Y_3Al_5O_{12-y-z}C_yN_z$:$Ce^{3+}$ can be obtained from the twenty-eighth embodiment and thirty-first embodiment, in which $0 \leq y \leq 0.3$ and $0.001 \leq z \leq 0.3$. In addition, the pure phase phosphor $Y_3Al_5O_{12-z}N_z$:$Ce^{3+}$ can be obtained from the thirty-second embodiment and thirty-third embodiment, in which $0.001 \leq z \leq 0.3$.

Then, the pure phase phosphor ($Y_3Al_5O_{12-y-z}C_yN_z$:$Ce^{3+}$ or $Y_3Al_5O_{12-x}N_x$:$Ce^{3+}$) is excited by the light source with 460 nm wavelength to obtain the illumination wavelength and the relative illumination intensity and the preferred result as shown in Table 3.

According to the result of the twenty-eighth embodiment to the thirty-third embodiment, to compare with the reference sample, after the organic nitrogen source or inorganic nitrogen source is added into the synthesized phosphor for performing nitridation reaction, the relative illumination intensity is largest increased in the thirty-third embodiment which is about 9%.

According to the aforementioned description, the nitridation reaction is performed by doping organic nitrogen source or inorganic nitrogen source into the synthesized phosphor or commercially available phosphor for the twelfth embodiment to the thirty-third embodiment. The doping result shows the relative illumination intensity and the illumination efficiency is increased respectively. Thus, for the synthesized phosphor or commercially available phosphor, the above doping method such as organic nitrogen source doping or inorganic nitrogen source doping did not change the crystal structure of the phosphor and the lattice defect would not be generated, which can apply for the various phosphor. By using above doping method, the quantum efficiency and the package efficiency of the phosphor molecular can be improved effectively and organic nitrogen source and inorganic nitrogen source having an advantage of a low cost and easy to obtain so as to the cost can be reduced effectively and can suitable for phosphor material with various colors to manufacture the white luminous device.

TABLE 3 the components of the nitrogen source for the phosphor in twenty-eighth embodiment to the thirty-third embodiment

| Embodiment/ reference sample | Synthesized phosphor (g) | $C_6H_{12}N_4$ (wt %) | $NH_4NO_3$ (wt %) | Excite wavelength (nm) | Illumination wavelength (nm) | Relative illumination wavelength |
|---|---|---|---|---|---|---|
| Reference sample | 0.5 | — | — | 460 | 543 | 100.00 |
| 28 | 0.5 | 5 | — | 460 | 542 | 104.90 |
| 29 | 0.5 | 10 | — | 460 | 542 | 100.80 |
| 30 | 0.5 | 20 | — | 460 | 542 | 105.80 |
| 31 | 0.5 | 50 | — | 460 | 541 | 105.70 |
| 32 | 0.5 | — | 5 | 460 | 541 | 107.94 |
| 33 | 0.5 | — | 10 | 460 | 542 | 109.04 |

As shown in FIG. 1, the thirty-fourth embodiment of the present invention provides a first luminous device 10 which includes a lamp tube 12, a first fluorescence excitation light source 16, an electrode 18 and a wavelength conversion element 14. the first fluorescence excitation light source 16 and the electrode 18 are disposed on two sides of the lamp tube 12, in which the first fluorescence excitation light source 16 can be light emitting diode (LED), laser diode (LD), organic light emitting diode (OLED), cold cathode fluorescent lamp (CCFL), external electrode fluorescent lamp (EEFL), or vacuum ultra violet (VUV). The wavelength conversion element 14 is a phosphor material which is coated on an inner wall (not shown) of the lamp tube 12 to absorb the excitation light source to emit the visible light. In one preferred embodiment, the phosphor material is partially coated on the inner wall of the lamp tube 12. It is noted to illustrate the phosphor material which is coated on the inner wall of the lamp tube 12 that is not to be limited herein. In addition, the phosphor material is one or more combination of red phosphor, green phosphor, blue phosphor and yellow phosphor. Furthermore, the lamp tube 12 of the first luminous device 10 further includes mercury (Hg) and inert gas. The first luminous device 10 can be used as the indicator device (such as traffic lights, the indicator of the instrument), the backlight (such as dashboard, the backlight of the displayer) or the lighting device (such as bottom light, traffic lights, notice boards), as so on.

As shown in FIG. 2, the thirty-fifth embodiment of the present invention provides a second luminous device 100 which includes a second fluorescence excitation light source 102, a lead frame 104, a phosphor material 106, a transparent resin 108 and a package material 110. The LED or LD is used as the second fluorescence excitation light source 102 for the second luminous device 100. The second fluorescence excitation light source 102 is disposed on the lead frame 104 and the second fluorescence excitation light source 102 is encapsulated by the transparent resin 108 mixed with the phosphor material 106. The package material 110 is used to encapsulate the second fluorescence excitation light source 102, the lead frame 104 and the transparent resin 108.

The present invention mainly provides the yellow phosphor material and the preparation method thereof, but it did not limit in yellow phosphor material and the preparation method. The preparation method and the structure for the red phosphor, green phosphor, or blue phosphor also can be used in this invention. The different between the present invention and the conventional prior art is that the present invention focused on the phosphor oxide structure, in which the chemical component of the phosphor precursor did not includes carbon atom (C) or nitrogen atom (N). Before the synthesized phosphor is entered into the high temperature furnace, the different kinds of the nitrogen source or the combination of the nitrogen source and carbon source thereof is doped into the phosphor precursor, in which the nitrogen source includes organic nitrogen source and inorganic nitrogen source. The nitrogen source is added in addition to substitute oxygen atom and to perform doping process. By this technique, the phosphor grain is to be grown up, the crystal structure is expanded, the surface morphology of the crystal structure is flatter, the lattice integrity is increased and the crystallinity of the phosphor and the illumination efficiency is also improved. In addition, the nitridation of the doping process did not only cause the excessive carbon which is generated by CRN method but also perform under atmosphere. At same time, the crystal structure of the commercially available phosphor would not be changed to generate the crystallographic defect so as to apply for any phosphor materials. According to above method, the quantum efficiency and package efficiency of phosphor material can be improved effectively such that the phosphor material can combine with another suitable for phosphor material with various colors to form a white luminous device Although specific embodiments have been illustrated and described, it will be obvious to those skilled in the art that various modifications may be made without departing from what is intended to be limited solely by the appended claims.

What is claimed is:

1. A phosphor material, characterized in that, comprising the chemical formula as $(Ln_{1-x-y-z}Ce_x)_3Al_5O_{12-y-z}C_yN_z$, wherein said Ln is one or more metals selected from Y, La, Pr, Nd, Eu, Gd, Tb, Dy, Yb, Er, Sc, Mn, Zn, Cu, Ni and Lu, and $0.01 \leq x \leq 0.3$, $0 \leq y \leq 0.3$ and $0.001 \leq z \leq 0.3$.

2. A method for forming a phosphor material, characterized in that:
doping an organic nitrogen sources or an inorganic nitrogen source into a phosphors precursor, a synthesized phosphor or a commercially available phosphor in a reduction environment under a sintering process with a high temperature, wherein said phosphor material is formed by said phosphor precursor having a chemical formula as $(Ln_{1-x-y-z}Ce_x)_3Al_5O_{12-y-z}C_yN_z$, wherein said Ln is one or more metals selected from Y, La, Pr, Nd, Eu, Gd, Th, Dy, Yb, Er, Sc, Mn, Zn, Cu, Ni and Lu, and $0.01 \leq x \leq 0.3$, $0 \leq y \leq 0.3$ and $0.001 \leq z \leq 0.3$.

3. The method according to claim 2, wherein said organic nitrogen source is one or more combination of $C_6H_{12}N_4$, $C_6H_5COONH_4$, $(NH_4)_2CO_3$, $HOC(CO_2NH_4)(CH_2CO_2NH_4)_2$, $HCO_2NH_4$, $C_{11}H_7N$, $C_{10}H_6(CN)_2$ or $C_{12}H_7NO_2$.

4. The method according to claim 2, wherein said inorganic nitrogen source is $NH_4NO_3$ or at least one inorganic nitrate salt consisting of $NH_4NO_3$.

5. The method according to claim 2, wherein said nitrogen source is a combination of said organic nitrogen source and said inorganic nitrogen source.

6. The method according to claim 2, wherein said phosphors precursor is a combination of a metal oxide, a metal carbonate and rear-earth oxides.

7. The method according to claim 2, wherein said commercially available phosphor is selected from the group consisting of $Y_3Al_5O_{12}:Ce^{3+}$, $Lu_3Al_5O_{12}:Ce^{3+}$, $(Ca,Sr,Ba)_2SiO_4:Eu^{2+}$, $(Ca,Sr,Ba)_2(Mg,Zn)Si_2O_7:Eu^{2+}$, $Sr_3SiO_5:Eu^{2+}$, $Ba_3SiO_5:Eu^{2+}$, $Sr_2Si_3O_8 \cdot 2SrCl_2:Eu^{2+}$, $Sr_2LiSiO_4F:Eu^{2+}$, $Sr_4Si_3O_8Cl_4:Eu^{2+}$, $Sr_2SiO_3Cl_2:Eu^{2+}$, $Ca_8Mg(SiO_4)_4Cl_2:(Eu^{2+},Mn^{2+})$, $Ca_3SiO_4Cl_2:Eu^{2+}$, $(Ca,Sr,Ba)_2Si_5N_8:Eu^{2+}$, $CaSc_2O_4:Ce^{3+}$, $Ca_3(Mg,Sc)_2Si_3O_2:Ce^{3+}$ and $(Ca,Sr)AlSiN_3:Eu^{2+}$.

8. The method according to claim 2, wherein said sintering process with a temperature ranges from 200° C. to 1600° C.

9. The method according to claim 2, wherein said sintering process with a duration is range from 0.5 hour to 48 hours.

10. A luminous device comprising a fluorescence excitation light source and a phosphor material, said phosphor material absorbed said fluorescence excitation light source to emit a visible light, and said phosphor material is characterized in that, comprising the chemical formula as $(Ln_{1-x-y-z}Ce_x)_3Al_5O_{12-y-z}C_yN_z$, wherein said Ln is a one or more metals selected from Y, La, Pr, Nd, Eu, Gd, Tb, Dy, Yb, Er, Sc, Mn, Zn, Cu, Ni and Lu, and $0.01 \leq x \leq 0.3$, $0 \leq y \leq 0.3$ and $0.001 \leq z \leq 0.3$.

11. The luminous device according to claim 10, wherein said fluorescence excitation light source is selected from the group consisting of a light emitting diode (LED), a laser diode (LD), an organic light emitting diode (OLED), a cold cathode fluorescent lamp (CCFL), an external electrode fluorescent lamp (EEFL), and a vacuum ultra violet (VUV).

* * * * *